United States Patent
Doudement

(10) Patent No.: US 7,649,158 B2
(45) Date of Patent: Jan. 19, 2010

(54) PREFORM-HEATING FURNACE COMPRISING A MEMBER FOR CONTROLLING THE MOVEMENT OF A HEATING MEANS BETWEEN INDEXED POSITIONS

(75) Inventor: Christophe Doudement, Octeville sur Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 589 days.

(21) Appl. No.: 11/631,415

(22) PCT Filed: Jul. 1, 2005

(86) PCT No.: PCT/EP2005/053137

§ 371 (c)(1),
(2), (4) Date: Jan. 3, 2007

(87) PCT Pub. No.: WO2006/010694

PCT Pub. Date: Feb. 2, 2006

(65) Prior Publication Data

US 2008/0073333 A1    Mar. 27, 2008

(30) Foreign Application Priority Data

Jul. 8, 2004  (FR) .................................. 04 51473

(51) Int. Cl.
*B29C 49/68* (2006.01)
*F27B 9/36* (2006.01)
*F27D 11/02* (2006.01)
*H05B 3/66* (2006.01)

(52) U.S. Cl. ...................... 219/404; 219/388; 219/411; 373/128; 373/130; 264/535; 264/458

(58) Field of Classification Search ....................... None
See application file for complete search history.

(56) References Cited

U.S. PATENT DOCUMENTS

| 4,606,723 | A | * | 8/1986 | Pasternicki | 219/388 |
| 4,923,395 | A | | 5/1990 | Coxhead et al. | |
| RE34,177 | E | * | 2/1993 | Coxhead et al. | 432/5 |
| 5,549,468 | A | * | 8/1996 | Mitchell et al. | 219/404 |
| 5,688,466 | A | | 11/1997 | Mitchell et al. | |
| 6,005,223 | A | | 12/1999 | Ogihara et al. | |
| 6,361,301 | B1 | * | 3/2002 | Scaglotti et al. | 264/458 |
| 7,307,243 | B2 | * | 12/2007 | Farkas et al. | 219/388 |

* cited by examiner

FOREIGN PATENT DOCUMENTS

DE    200 05 210    6/2000

*Primary Examiner*—Joseph M Pelham
(74) *Attorney, Agent, or Firm*—Young & Thompson

(57) ABSTRACT

The invention relates to a furnace (10) for heating preforms (20), of the type that comprises a preform-heating tunnel (12). According to the invention, the tunnel consists of a heating module (18) comprising vertical walls (14, 16) between which the preforms (20) travel. Moreover, at least one wall (16) of the module (18) is provided with at least one heating means (32) which is mounted to supports (34) such that it can move transversely and means (40) for adjusting the transverse position of the heating means (32) comprising at least one member (42) for controlling the movement of the heating means (32) between at least two indexed positions. The invention is characterized in that the control member (42) comprises an indexing boss (54) which can deform elastically such as to fit inside the complementary indexing notches (56, 58) on the corresponding support (34) at proximal and distal positions respectively.

15 Claims, 2 Drawing Sheets

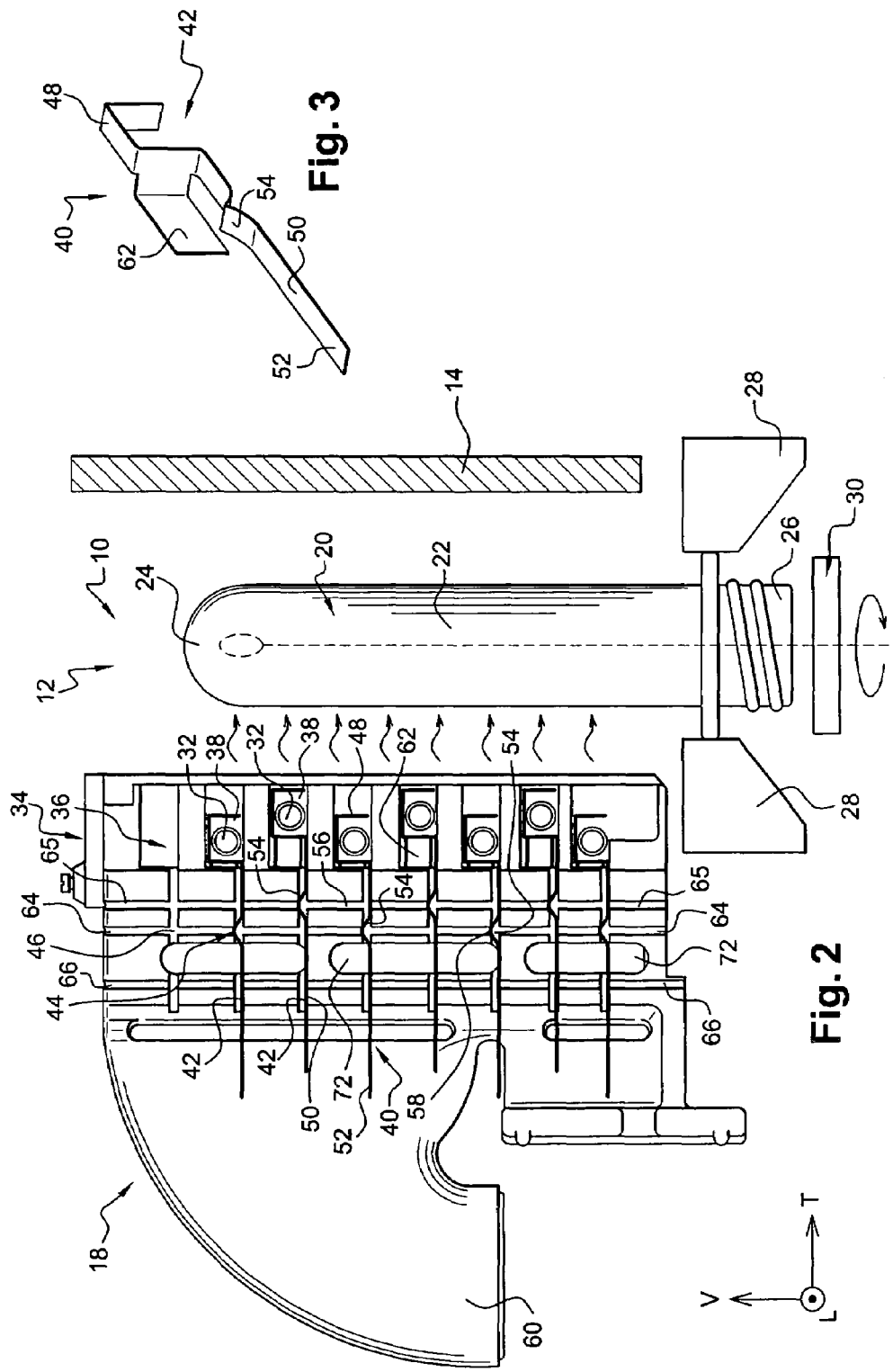

PREFORM-HEATING FURNACE COMPRISING A MEMBER FOR CONTROLLING THE MOVEMENT OF A HEATING MEANS BETWEEN INDEXED POSITIONS

The present invention relates to a furnace for heating a preform comprising a member for controlling the movement of a heating means between indexed positions.

The manufacture of receptacles, and particularly of bottles, made of a thermoplastic such as polyethylene terephthalate (PET) is usually carried out based on previously injected preforms that are shaped as receptacles by an operation of blow molding or stretch-blow molding their bodies and their bottom. The neck of the preforms is not modified when they are converted into receptacles.

Before carrying out the blow molding or stretch-blow molding operation, it is necessary to heat in a heating furnace a first part of each preform, more precisely the body and the bottom, to a temperature greater than the temperature of glass transition of the constituent material, in order to soften said material and thus allow it to be deformed.

For this, it is known practice to carry out the heating of said first part of the preforms in a furnace comprising a longitudinal heating tunnel. A furnace comprises one or more successive modules along the tunnel. Each module comprises a superposition of tubes (halogen lamps) placed along a wall of the tunnel, with their axis parallel to the longitudinal axis of the tunnel; the other wall of the tunnel comprises reflector elements and the preforms are moved between the lamps and the reflector elements while being set to rotate on themselves, in order to distribute the temperature over their periphery.

It should however be noted that the temperature distribution is not usually even at all points of said first part of the preforms, the heating profile being predetermined according to the shape of the final receptacle.

In order to obtain a predetermined heating profile, it is known practice:
  to adjust the emission power of each of the lamps of each of the modules in an appropriate manner: in other words, the lamps of one and the same module do not all usually emit at the same power, and the same applies to the corresponding lamps of two distinct modules that do not usually emit at the same power; and/or
  in some cases, to obtain receptacles of a particular profile (bottles of oval section for example) to modify the arrangement of the reflectors so that, on one section, the temperature varies (document FR-A-2.703.944 in the name of the Applicant discloses such a modified arrangement); and/or
  to mount the heating means so as to be movable transversely and with a possibility of adjusting their position in order to adjust the distance between each of the heating means and the bodies of the preforms: such an adjustment capability makes it possible to adapt the configuration of the furnace to the profile of the preforms to be used for a production of given receptacles, which increases the latitude of heat adjustment, in addition to the measures specified hereinabove.

Currently, the distance of the heating means is adjusted by means of sets of spacers whose thickness is calibrated and that are interposed between a part of the heating means, usually the connectors, and a fixed reference part fixedly attached to the heating module. It is therefore possible to position each lamp at a precise distance from the body of the preforms before immobilizing it in the desired position, for example by locking means such as screws.

However, although allowing a precise adjustment of the position of each heating means, such a solution does not give entire satisfaction.

The operations for adjusting the position of the heating means require in particular a long and costly immobilization of the heating furnaces because it is necessary to remove a part of each of the modules that the furnace comprises to access the heating means and position them individually.

In addition, the operating time is increased by the fact that the operator must unlock and relock each heating means and that the spacers, usually of small dimensions, are likely to be lost by the operators during the removal and adjustment operations.

Also known from document U.S. Pat. No. 4,923,395 is a furnace for heating preforms comprising means for adjusting the transverse position of the radiation heating means that are mounted so as to be mobile transversely on supports between several indexed positions.

The adjustment and indexation means consist of a ball-based device which, fixedly attached to the furnace, comprises a nut for retaining a spring forcing a ball into one of the complementary notches that each transverse stem forming the supports of the heating means comprises. The support stems are mounted so as to slide transversely and are able to be maneuvered between the various positions by means of a handle situated at the distal end of each support stem.

However, such a ball-based locking device does not give entire satisfaction, particularly in that it is costly to produce because of the many machining operations required but also from the point of view of reliability of the device in operation.

Specifically, in heating furnaces, the high temperatures reached cause considerable heat expansions so that such a ball-based device is particularly sensitive to the risks of malfunction, particularly by jamming of the ball-spring assembly.

In addition, in operation of an installation comprising such a furnace, vibrations are likely to cause the unscrewing of the nuts for retaining the springs that force the balls into the notches of the support stems. Thus, there is a risk that the device will unlock and the stems supporting the heating means will no longer be immobilized at the required determined distance from the preforms.

The adjustment means consist of metal pieces that have a great thermal inertia and to which there is a considerable transfer of heat that is transmitted to the connectors causing a reduction in the service life of the heating means.

The particular object of the invention is to remedy these disadvantages and propose a preform-heating furnace comprising enhanced means of controlling and adjusting the position of the heating means.

For this purpose, the invention proposes a furnace for heating preforms, particularly preforms made of thermoplastic designed for the manufacture of receptacles by blow molding or by stretch-blow molding, of the type comprising a longitudinal tunnel for heating at least a part of the preforms, the tunnel comprising at least one heating module with vertical walls between which the preforms travel, at least one vertical wall of the heating module being provided with at least one radiation heating means that is mounted so as to be movable transversely on supports and means for adjusting the transverse position of the heating means to adjust the transverse distance between the heating means and said part of the preforms, the means for adjusting the position of the heating means comprising at least one member for controlling the movement of the heating means between at least two, respectively proximal and distal, transverse positions that are indexed by indexation means intervening between the control member and the supports so as to position the heating means at a determined transverse distance from said part of the preforms, characterized in that the control member comprises an indexation boss that is able to deform elastically so as to fit into complementary notches of the support corresponding respectively to the proximal and distal positions.

Thanks to the invention, the change of position of each heating means is simple and rapid, specifically the movements of the heating means between the various indexed transverse positions are obtained by the operator simply pulling or pushing on the control means.

According to other features of the invention:
- the supports comprise at least two transverse supports between which at least one heating means extends longitudinally, each transverse support comprising at least one front housing in which one of the ends of the heating means is mounted with clearance;
- each transverse support comprises at least one transverse groove which opens respectively at the front in the housing for mounting the heating means and at the rear outside the support and in which the control member slides transversely forward or rearward;
- the control member comprises a head section, received in the housing of the support, that is connected transversely in movement to the heating means;
- the control member comprises an intermediate connection section which extends transversely behind the head section and which slides in the transverse groove of the support;
- the control member comprises, transversely behind the intermediate connection section, a tail section extending as a protrusion outside the groove that forms a prehensile part for controlling the forward or rearward movement of the heating means between the proximal and distal positions;
- the boss for indexing the transverse positions of the heating means is made as one piece in the intermediate section of the control means;
- the heating means comprises, at each of its ends, a connector that is fixedly attached to the head section of the control member;
- the transverse supports comprise means for cooling, by air circulation, the connectors of the heating means;
- the control member comprises at the front a deflector so as to limit the circulation of the cooling air in the direction of the heating means;
- each transverse support forms a rack comprising vertically a plurality of housings so as to allow the vertical superposition of several heating means over a determined height according to the height of said body of the preforms;
- the indexation means form means for automatically locking the heating means in its proximal and distal positions.

Other features and advantages of the invention will appear on reading the following detailed description and on seeing the drawings in which:

FIG. 2 is a detailed view in perspective illustrating one of the supports between which the heating means extend and in which the control member is mounted so as to slide;

FIG. 3 is a detailed view in perspective of the member for controlling the movement of the heating means.

In the following description, identical reference numbers indicate pieces that are identical or have similar functions.

Figure 1:
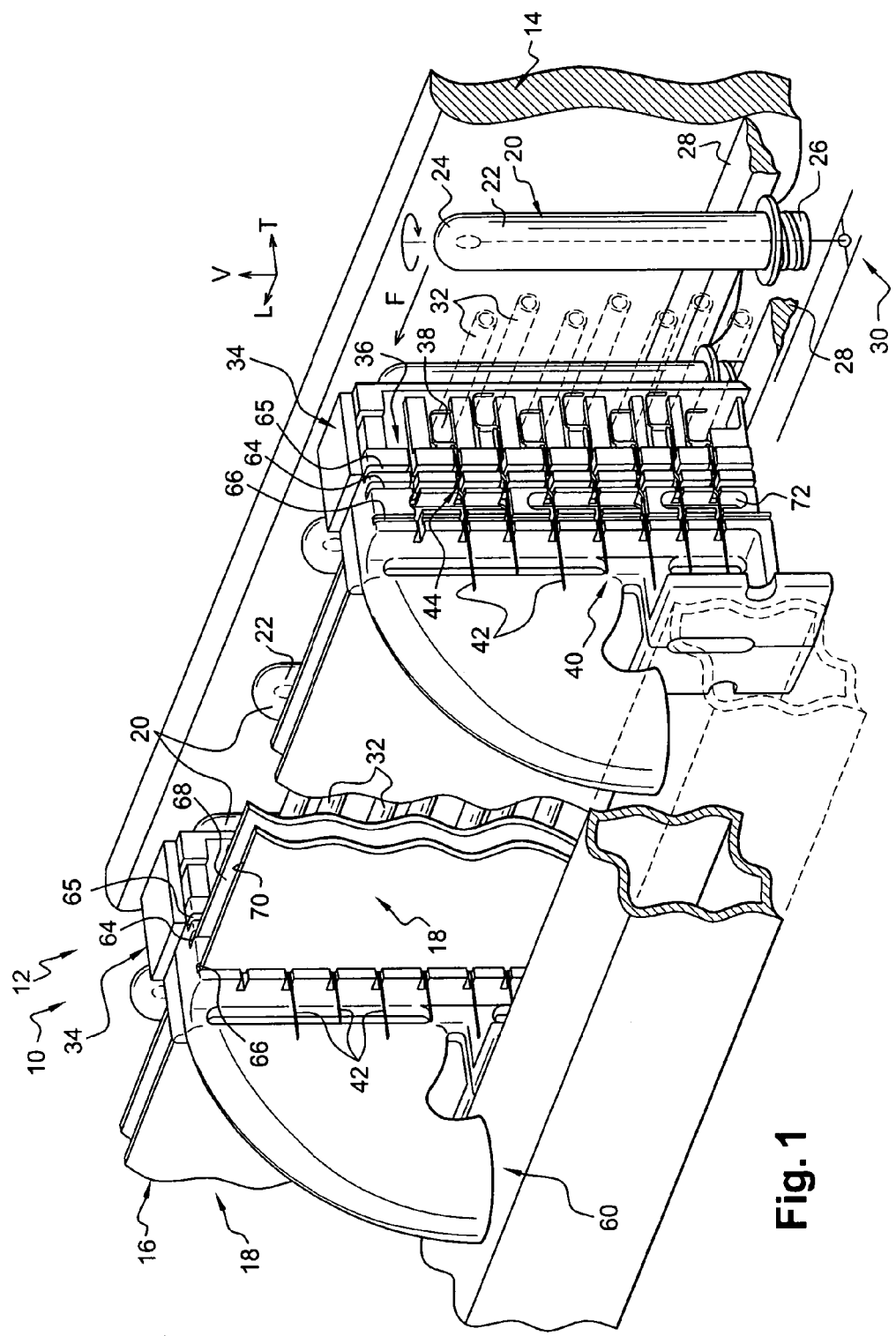
FIG. 1 is a partial view in perspective of a heating furnace illustrating a heating module comprising heating means able to be moved transversely between positions indexed by means of control rails.

By convention, and in a nonlimiting manner, the terms "front" or "rear" and the directions "longitudinal", "transverse" or "vertical" will be used to identify respectively elements or positions according to the definitions given in the description and the trihedron (L, V, T) shown in the figures.

FIG. 1 shows a part of a heating furnace 10 comprising a longitudinally oriented heating tunnel 12 which two vertical side walls delimit transversely, respectively a right vertical side wall 14 and a left vertical side wall 16.

The tunnel 12 comprises successively in its longitudinal direction modules 18 for heating the preforms 20 one of which is more particularly illustrated in FIGS. 1 and 2.

In a known manner, a receptacle preform 20, obtained for example by injection molding, comprises mainly a body 22 with a substantially axisymmetric outer cylindrical surface with a vertical axis with a thick wall. The preform 20 comprises a first end of the body 22, here the top end, a hemispherical bottom 24 with a thick wall and, at the other end, here the bottom end, a collar 26 or neck shaped to its definitive shape and dimensions.

As explained in the preamble, the preliminary heating step consists in heating the body 22 and the bottom 24 of the preform 20, excluding the neck 26, to a temperature greater than the glass transition temperature or softening temperature of the thermoplastic constituting the preform 20.

Specifically, the neck 26 of the preform 20, being shaped to its final shape and dimensions during injection of the preform, must not be deformed during the heating and/or blow molding operations.

It is therefore essential to keep the neck 26 at a temperature below the glass transition temperature; that is why the preforms 20 are usually placed with the neck 26 down, on the outside of the tunnel 12, in order to limit a reheating of the neck 26 by upward convection movements of the hot air, and/or the neck is protected from the radiations.

Advantageously, to protect the necks 26 from the radiations, the heating furnace 10 comprises means for protecting the necks 26 of the preforms 20, such as deflectors 28 that extend longitudinally along the journey made by the preforms 20 in the direction of the arrow F from upstream to downstream in the heating tunnel 12 of the furnace 10.

Each cold preform 20 extending vertically with the neck 26 down is conveyed by a conveyor device 30 from a first upstream end of the heating tunnel 12, in order to travel inside the heating modules 18 of the heating tunnel 12 in which the body 22 and the bottom 24 of the preform 20 are heated beyond the glass transition temperature before coming out through the second, downstream, end of the heating tunnel 12. The preform 20 thus reheated is then ready for the blow molding or stretch-blow molding operation.

To ensure the deep heating of the bottom 24 and of the cylindrical wall of the body 22 of the preform 20 over the whole of its periphery, the conveyor device 30 preferably comprises means (not shown) for setting the preforms 20 to rotate on themselves during their travel in the heating tunnel 12 of the furnace 10.

The heating furnace 10 may comprise one or more heating modules 18 which each form a portion of heating tunnel 12 and which are aligned one after the other so as to form a single, very long tunnel. The heating tunnel 12 is furthermore capable of comprising, between two successive heating modules 18, non-heating zones, or stabilization zones (not shown).

The heating module 18 comprises radiation heating means 32, such as infrared radiation lamps, usually of tubular shape, which extend longitudinally generally parallel with the flow of preforms 20 traveling in the heating tunnel 12 in the direction of the arrow F. In the figures, these means are placed along the left vertical side wall 16.

In a known manner, the right vertical side wall 14 is for example furnished, in line with the heating means 32, with reflectors and/or orifices (not shown) for blown air to pass through in order to promote a good thermal penetration in the whole thickness of the wall of the body 22 and the bottom 24 of the preform 20. The presence of reflectors prevents the effective radiation from being absorbed by this wall 14 and the blown air makes it possible to clear away the convection heat caused by the heating means 32 in order to promote the penetration of the radiation that they generate in the thickness of the material forming the body 22 and the bottom 24 of the preform 20.

In a known manner, also, the heating means 32 of the heating module 18 consist of lamps, here of tubular shape, that extend longitudinally between two transverse supports 34 respectively upstream and downstream.

Each support 34 comprises laterally at least one front housing 36 in which one of the ends of the tubular lamp forming the heating means 32 is mounted with clearance in the transverse direction. More precisely, each lamp comprises at each of its longitudinal ends a connector 38 that is received in the front housing 36.

The connector 38 and the front housing 36 are of matching shape, here generally parallelepipedic.

Each lamp forming a heating means 32 is thus mounted so as to be movable transversely between two supports 34 that comprise means 40 of adjusting the transverse position of each lamp so as to allow an adjustment of the transverse distance between each lamp forming a heating means 32 and the part to be heated, that is to say the body 22 and the bottom 24 of each preform 20.

Each support 34 here forms a rack comprising vertically a plurality of front housings 36 so as to allow the vertical superposition of several heating means 32 extending parallel with the longitudinal direction of travel of the preforms 20 and over a determined height according to the total height of the body 22 and of the bottom 24 of the preforms 20.

The means 40 for adjusting the position of the heating means 32 comprise at least one member 42 for controlling the movement of each heating means 32 between at least two transverse positions, respectively a first proximal position and a second distal position, that are indexed by indexation means 44.

As can be seen in FIG. 2, the means 44 for indexing the proximal and distal positions of the heating means 32 intervene between the control member 42 and the support 34 so as to position each heating means 32 at a determined transverse distance from the body 22 and the bottom 24 of the preforms 20.

Each support 34 comprises a transverse groove 46 for the mounting of each control member 42. The transverse groove 46 is open longitudinally outward and emerges transversely respectively at the front, in the front housing 36 for mounting one of the connectors 38 of a lamp, and at the rear outside the support 34 of the heating module 18.

Each control member 42 is capable of sliding transversely from front to rear, and vice-versa, in the groove 46 to move the associated heating means 32 between one and the other of its indexed positions.

Accordingly, the control member 42 comprises a head section 48 that extends transversely to the front into the front housing 36 of the support 34, that is to say out of the transverse groove 46, and that is linked transversely to the connector 38 of the heating means 32 whose movement it controls.

The head section 48 is generally in the shape of an inverted "U" in cross section and its dimensions are complementary to the parallelepipedic-shaped connector 38 onto which it is advantageously tightly mounted.

As can be seen in the enlargement of FIG. 3, the control member 42 comprises an intermediate connection section 50 which extends transversely behind the head section 48 and which extends transversely rearward via a tail section 52.

The tail section 52 extends as a protrusion outside the transverse groove 46 and forms a prehensile part on which an operator is capable of exerting a forward pushing force or rearward pulling force in order, by this operation of the control member 42, to move the heating means 32 between its proximal and distal positions.

As can be seen in FIGS. 1 and 2, the control member 42 comprises an indexation boss 54 that is able to deform elastically, here in the vertical direction, so as to fit into complementary notches of the support 34.

The transverse groove 46 comprises in its top horizontal face at least one front notch 56 and one rear notch 58 corresponding respectively to the proximal and distal positions of the heating means 32.

The indexation boss 54 here is made as one piece in the intermediate section 50 of the control member 42 that slides in the transverse groove 46.

Advantageously, the transverse supports 34 comprise air circulation means 60 to cool the connectors 38 of each heating means 32 and thus extend the service life of the heating means 32.

However, the control member 42 comprises, at the junction between the head section 48 and the intermediate section 50, a vertical deflector 62 extending transversely rearward so as to limit, when the control member 42 is in the front proximal position, the circulation through the front housing 36 of the air intended to cool the connectors 38, particularly in the direction of the heating means 32.

Preferably, the transverse supports 34 or racks comprise laterally and transversely behind the front notches 56 and rear notches 58, otherwise called indexation notches, two substantially rectilinear vertical grooves, a front vertical groove 64 and a rear vertical groove 66, in which a front panel 68 and a rear panel 70 are mounted.

The front panel 68 here forms a reflector whose front vertical face reflects the radiation of the heating means 32 in the direction of the part to be reheated, that is to say the body 22 and the bottom 24 of the preforms 20.

Advantageously, the support 34 such as a rack comprises cooling openings 72 which communicate with the cooling means 60 and which emerge between the front panel 68 and rear panel 70 so as to cause an air circulation and cool particularly the front panel 68 and the rear part of the control members 42.

Advantageously, the control member 42 is a metal sheet that is thin, which promotes heat exchanges with the surrounding air and consequently its cooling, and the cooling of the connector 38 to which it is fixedly attached in movement.

The support 34 such as the rack here comprises laterally two front vertical grooves 64 and 65 which traverse the transverse grooves 46 in which the control members 42 slide so that the intersection of each of the front vertical grooves 64 and 65 with a transverse groove 46 forms respectively the rear notches 58 and front notches 56 into which the indexation boss 54 supported by the control member 42 fits.

The front panel 68 is therefore able to be mounted in one or other of the front vertical grooves 64 or 65.

Advantageously, the means 40 of adjustment by indexation form means for automatically locking the heating means 32 in their proximal and distal positions so that it is possible to simplify the design of a heating module 18 by deleting the locking means of the prior art such as the screws and to reduce the intervention time of the operator in order to make the positional adjustments of the heating means 32.

Naturally, each heating means 32 is capable of being moved between more than two indexed positions to suit the applications and the desired precision in the adjustment of the transverse distance.

Preferably, the tail section 52 of each control member 42 comprises visual control means (not shown), such as lines or notches, indicating to the operator in a simple and immediate manner the position of the corresponding heating means 32.

Advantageously, the control member 42 that protrudes at the rear of the heating module 18 allows the operator to intervene without having to carry out any removal operation on the heating module 18 to change position.

Advantageously, the indexed transverse position of the heating means 32 is locked automatically when the indexation boss 54 enters one of the notches of the indexation means 44.

The invention claimed is:

1. A furnace (10) for heating preforms (20) by blow molding or by stretch-blow molding, of the type comprising at least one tunnel (12) for heating at least a part (22, 24) of the preforms (20), the tunnel extending in a longitudinal direction and comprising at least one heating module (18) with vertical walls (14, 16) between which the preforms (20) travel, at least one vertical wall of the heating module (18) being provided with at least one radiation heating means (32) that is mounted so as to be movable on supports in a direction transverse to the longitudinal direction, (34) and means (40) for adjusting the transverse position of the heating means (32) to adjust the transverse distance between the heating means (32) and said part (22, 24) of the preforms (20), the means (40) for adjusting the position of the heating means (32) comprising at least one control member (42) for controlling the movement of the heating means (32) between at least two, respectively proximal and distal, transverse positions that are indexed by indexation means (54, 56, 58) intervening between the control member (42) and the supports (34) so as to position the heating means (32) at a determined transverse distance from said part (22, 24) of the preforms (20), characterized in that the control member (42) comprises an indexation boss (54) that is able to deform elastically so as to fit into complementary indexation notches (56, 58) of the support (34) corresponding respectively to the proximal and distal positions.

2. The heating furnace as claimed in claim 1, characterized in that the supports comprise at least two transverse supports (34) between which at least one heating means (34) extends longitudinally, each support (34) comprising at least one front housing (36) in which one of the ends of the heating means (32) is mounted with clearance.

3. The heating furnace (10) as claimed in claim 2, characterized in that each support (34) comprises at least one transverse groove (46) which opens respectively at the front in the housing (36) for mounting the heating means and at the rear outside the support (34) and in which the control member (42) slides transversely forward or rearward.

4. The heating furnace (10) as claimed in claim 2, characterized in that the control member (42) comprises a head section (48), received in the housing (36) of the support (34), that is connected transversely in movement to the heating means (32).

5. The heating furnace (10) as claimed in claim 3, characterized in that the control member (42) comprises an intermediate connection section (50) which extends transversely behind the head section (48) and which slides in the transverse groove (46) of the support (34).

6. Heating furnace (10) as claimed in claim 5, characterized in that the control member (42) comprises, transversely behind the intermediate connection section (50), a tail section (52) extending as a protrusion outside the groove (46) that forms a prehensile part for controlling the forward or rearward movement of the heating means (32) between the proximal and distal positions.

7. The heating furnace (10) as claimed in claim 5, characterized in that the boss (54) for indexing the transverse positions of the heating means (32) is made as one piece in the intermediate section (50) of the control member (42).

8. The heating furnace (10) as claimed in claim 7, characterized in that the heating means (32) comprises, at each of its ends, a connector (38) that is fixedly attached to the head section (48) of the control member (42).

9. The heating furnace (10) as claimed in claim 7, characterized in that the transverse supports (34) comprise means (60, 72) for cooling, by air circulation, the connectors (38) of the heating means (32).

10. The heating furnace (10) as claimed in claim 9, characterized in that the control member (42) comprises at the front a deflector (62) so as to limit the circulation of the cooling air in the direction of the heating means (32).

11. The heating furnace (10) as claimed in claim 2, characterized in that each support (34) forms a rack comprising vertically a plurality of housings (36) so as to allow the vertical superposition of several heating means (32) over a determined height according to the height of said part (22, 24) of the preforms (20).

12. The heating furnace (10) as claimed in claim 1, characterized in that the indexation means (54, 56, 58) form means for automatically locking the heating means (32) in its proximal and distal positions.

13. The heating furnace (10) as claimed in claim 3, characterized in that the control member (42) comprises a head section (48), received in the housing (36) of the support (34), that is connected transversely in movement to the heating means (32).

14. The heating furnace (10) as claimed in claim 6, characterized in that the boss (54) for indexing the transverse positions of the heating means (32) is made as one piece in the intermediate section (50) of the control member (42).

15. The heating furnace (10) as claimed in claim 8, characterized in that the transverse supports (34) comprise means (60, 72) for cooling, by air circulation, the connectors (38) of the heating means (32).

* * * * *